Dec. 6, 1938.　　　　　R. M. GILSON　　　　　2,139,330

BATTERY CHARGING APPARATUS

Filed Dec. 17, 1935

INVENTOR
Robert M. Gilson.
BY
HIS ATTORNEY

Patented Dec. 6, 1938

2,139,330

UNITED STATES PATENT OFFICE 2,139,330

BATTERY CHARGING APPARATUS

Robert M. Gilson, Pittsburgh, Pa., assignor to The Union Switch & Signal Company, Swissvale, Pa., a corporation of Pennsylvania Application December 17, 1935, Serial No. 54,875

2 Claims. (Cl. 171—97)

My invention relates to battery charging apparatus of the type wherein provision is made for charging a battery at two different rates, and wherein automatic means are provided for changing from the higher rate to the lower rate when the battery becomes fully charged.

One feature of my invention is the provision in apparatus of this character, of means for transferring a load from an A. C. source to a reserve battery source in case of a predetermined decrease in the A. C. line voltage or in case of failure of the A. C. source. Another feature of my invention is the provision of means for preventing irregular operation due to temperature variations. A further feature of my invention is the provision of means for indicating whether current is being supplied to the load from the A. C. source or from the battery. Other features will become apparent as the description progresses.

I will describe three forms of apparatus embodying my invention, and will then point out the novel features thereof in claims.

The present application is a continuation in part of my copending application Serial No. 739,296, filed August 10, 1934, for Battery charging apparatus, in so far as the subject matter common to the two cases is concerned.

Figure 1:
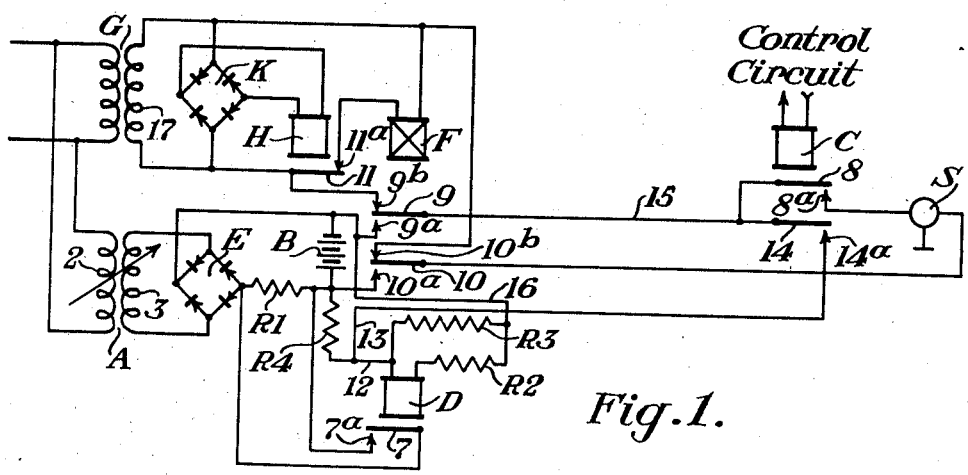
Figure 2:
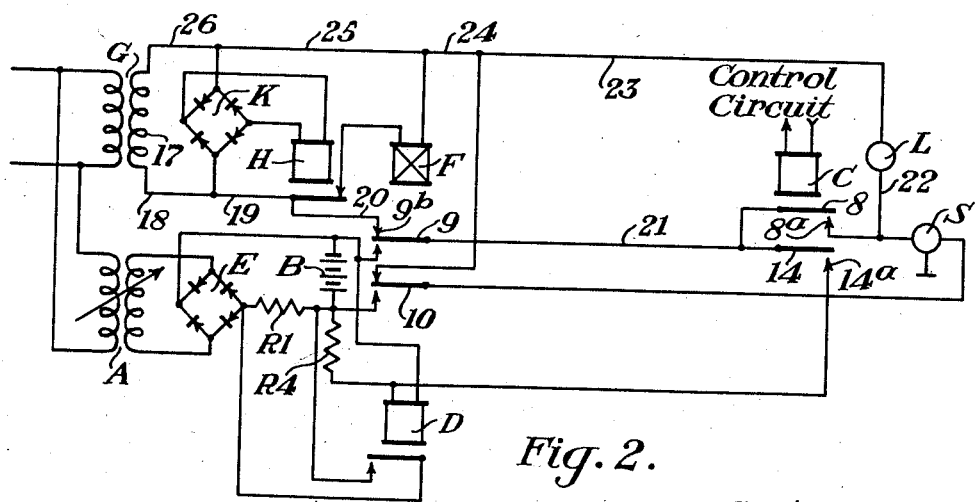
Figure 3:
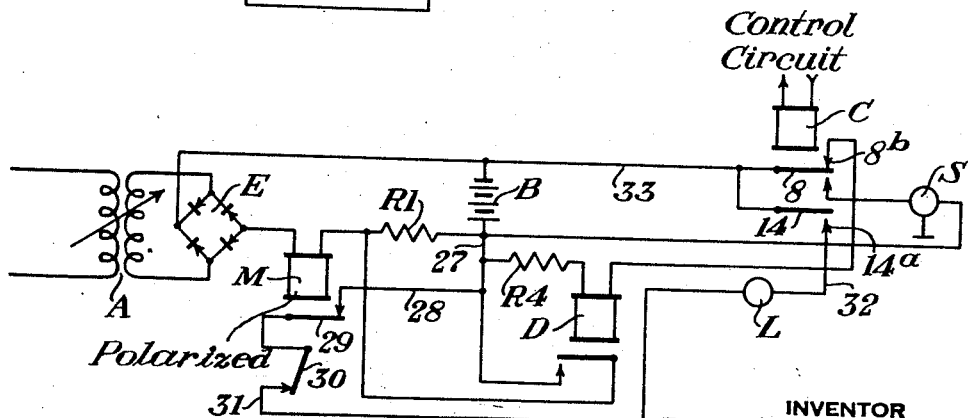

In the accompanying drawing, Fig. 1 is a diagrammatic view showing one form of battery charging apparatus embodying my invention. Figs. 2 and 3 are diagrammatic views showing modified forms of the apparatus of Fig. 1, and also embodying my invention.

Similar reference characters refer to similar parts in each of the several views.

In railway signaling installations where A. C. power is available for illuminating the signals, it is customary to provide an emergency source of current such as a storage battery which becomes available for signal lighting at such times as the A. C. power is interrupted. Where the A. C. source is subject to voltage fluctuations, or where the signals are located at the remote end of a relatively long signal lighting line subject to wide load variations, it frequently occurs that the lamp voltage at the signals is insufficient for providing the required illumination for insuring proper protection to traffic. It is desirable, therefore, to provide some means for maintaining an adequate voltage at the signal lamps at all times.

Since the usual power transfer relay which transfers the signal load to the reserve source when the A. C. power fails is required to handle a relatively heavy current over its contacts, this relay must necessarily be of rugged construction which requirement renders it difficult to obtain the required operating sensitivity on small voltage changes in a relay of this type. Also, due to the fact that the contact pressure decreases greatly as the release point of the power transfer relay is approached, resulting in an unreliable signal indication, it is impractical to employ the power transfer relay as a voltage type of relay.

The apparatus embodying my invention provides simple and effective means for insuring proper signal voltage at all times and at the same time provides means for maintaining the reserve battery fully charged irrespective of load requirements and wide temperature variations.

Referring first to Fig. 1, the reference character A designates a transformer, the primary 2 of which is constantly connected with a source of alternating current which is not shown in the drawing. The secondary 3 of this transformer is constantly connected with the input terminals of a full wave rectifier E, and the output terminals of this rectifier are constantly connected with the terminals of a storage battery B through a regulating impedance which may be of any suitable type such as a reactor or a resistor but which is shown in the drawing as a resistor R1.

The terminals of battery B are constantly connected with the operating winding of a charging-rate control relay D through the temperature compensating resistors R2, R3, and R4. At times, the terminals of battery B are also connected with a load S through the back contact 8—8ª of a relay C as well as the back contacts 9—9ª and 10—10ª of a power transfer relay F. The load S may, for example, be an electric lamp associated with a railway signal, and the relay C may be the usual device for connecting the battery with or disconnecting it from such lamp. The control of the relay C has nothing to do with my present invention and, consequently, the circuit for this relay is not shown in the drawing.

As long as the power transfer relay F remains energized, the load S receives alternating current from the secondary winding 17 of a transformer G, over the front contacts 9—9ᵇ and 10—10ᵇ of relay F as well as the back contact 8—8ª of relay C. The energizing circuit for relay F includes the front contact 11—11ª of an under-voltage relay H which is designed to release upon a predetermined decrease in the voltage of the A. C. source which energizes transformer G. As shown, the relay H is of the D. C.

type and is energized through the rectifier K, but this relay may, of course, be of the A. C. type in which case it will be energized directly from transformer G.

The operating winding of the charging-rate control relay D may consist of ordinary copper wire which has a positive temperature coefficient of resistance. Interposed in series with the operating winding is a resistor R2 having substantially zero temperature coefficient of resistance. A second resistor R3 having substantially the same temperature coefficient as the operating winding is connected in multiple with this winding and with resistor R2. A third resistor R4 having substantially zero temperature coefficient of resistance is connected in series with the multiple circuit including resistors R2 and R3 as well as the operating winding.

The operating winding of relay D may be designed to vary in resistance from 80 ohms to 120 ohms, for example, with ambient temperature variations between minus 25° centigrade and plus 75° centigrade. Resistor R3 may then be designed to vary between 160 ohms and 240 ohms with the same variation in ambient temperature. These are the values that would usually be chosen for a six-cell lead battery which when fully charged has a terminal difference of potential of 13.5 volts. If the pickup value of relay D at normal temperature (25° centigrade) is 1.4 volts, 0.014 ampere, for example, it can be shown by calculation that the pickup voltage for the relay and resistor combination required at minus 25° centigrade is 13.92; at plus 25° centigrade is 13.55; and at plus 75° centigrade is 13.38 volts. This variation is substantially that which is required to insure that the voltage at which the relay D will pick up corresponds with the fully charged condition of the battery under different temperature conditions. In other words, to insure a fully charged battery under low temperature conditions, it is necessary that it be charged at a higher voltage per cell at low temperatures than at high temperatures.

It is obvious that by changing the proportions of the various resistors associated with relay D, the pickup value of the relay can be made to remain substantially constant for widely different temperatures, or can be made to vary in almost any desired manner either in direct proportion or in inverse proportion to temperature variations.

The operation of the apparatus shown in Fig. 1 is as follows: Normally, the parts will be in the positions in which they are shown in the drawing. The release of relay C, which relay may be either an approach lighting relay or an interlocking relay at a highway crossing location, causes signal S to become energized from transformer G over the front contacts 9—9$^b$ and 10—10$^b$ of relay F. As long as the voltage of the A. C. source is sufficiently high for proper illumination of signal S, the under-voltage relay H will remain energized, thus maintaining relay F in its energized condition. Should the A. C. source fail for any reason, relay F will be deprived of current and will immediately release. When a decrease in the voltage of the A. C. source occurs, relay H will release and will open the energizing circuit for relay F at front contact 11—11$^a$, whereupon relay F will also release.

The release of relay F transfers the lamp load to the reserve battery over an obvious circuit. Also, the release of relay F causes a partial shunt to be applied around relay D over a circuit which includes wires 12 and 13, back contact 14—14$^a$ of relay C, wire 15, back contact 9—9$^a$ of relay F, and wire 16, to the junction point of resistors R2 and R3. The above shunt causes relay D to release, thus closing back contact 7—7$^a$ which short-circuits the resistor R1 and causes the battery B to be charged at the high rate.

As soon as relay C is restored to its normal picked up position, the signal load is removed from the battery B and the partial shunt around relay D is interrupted at contact 14—14$^a$. However, the pickup of relay D will not necessarily follow unless the battery B has become fully charged in the meantime. As long as the battery charging process has not been completed, relay D will remain released irrespective of the picked up or released condition of relay F and will pick up only when the battery voltage reaches the proper value as determined by the ambient temperature, and only if the A. C. power is effective and is of the proper voltage. Each time that the battery B is called upon to supply current to the signal S, a check is automatically provided on the condition of the battery through the release of relay D, and an increase in the battery charging rate occurs automatically to compensate for the load current drawn from the battery.

It will be apparent, therefore, that the apparatus of Fig. 1 insures that the signal S will receive the proper voltage either from the A. C. source or, alternatively, from a reserve battery which is maintained adequately charged at all times.

Referring now to Fig. 2, the apparatus shown in this view is the same as that which is shown in Fig. 1 except that the temperature compensation for relay D is shown as being of different character to simplify the drawing and also, an indicating lamp L is added for providing a visual indication at such time as the signal is being lighted from the A. C. source. The lamp L serves to apprise trainmen on passing trains of the condition of the A. C. source of supply as well as the frequency with which the reserve battery is called upon to supply current, since a dark indicating lamp shows that the A. C. source has either failed or its voltage is inadequate for a satisfactory signal indication.

The relay D of Fig. 2 may be wound with copper wire as in Fig. 1. The series resistor R4 is wound with wire having substantially zero temperature coefficient of resistance and has a value four to five times the resistance of the winding of relay D. Consequently, the change in resistance of the operating winding of relay D with temperature is masked by the comparatively larger resistance of the resistor R4 which latter resistor is not affected by temperature changes. If preferred, the compensating arrangement used in conjunction with relay D of Fig. 1 can be used for compensating relay D in Fig. 2.

If the A. C. source in Fig. 2 is supplying current at proper voltage as indicated by the picked-up condition of relay F, then when relay C is released to energize signal S, the indicating lamp L will become lighted over a circuit which may be traced from the lower terminal of winding 17 of transformer G, wires 18, 19, and 20, front contact 9—9$^b$ of relay F, wire 21, back contact 8—8$^a$ of relay C, wire 22, lamp L, and wires 23, 24, 25, and 26, to the upper terminal of winding 17. Should relay F become deenergized for any reason, transferring the signal load to the reserve battery, then lamp L will become extinguished due to the interruption of its energizing circuit at front contact 9—9b of relay F. The charging current to battery B when the battery is furnishing current to the load is increased each time that relay C is released, by virtue of the shunt around relay D which is closed at back contact 14—14a of relay C which shunt releases relay D, thus short-circuiting the resistor R1.

Referring now to Fig. 3, the signal S in this view receives current from the battery B at all such times as relay C is released, the A. C. source being used only for trickle-charging the storage battery. Each time that relay C is released for energizing signal S, relay D also becomes released due to the opening of front contact 9—9b of relay C and relay D causes an increase in the charging current supplied to the battery, to take care of the load represented by signal S. When the load is disconnected at relay C, then relay D picks up and decreases the charging rate, provided that the voltage of battery B is at the proper fully charged value.

In order to check that sufficient charging current is flowing into the battery at such time as the battery is supplying the signal load, I have provided a polarized relay M which is energized by the charging current and which is arranged to release when the charging current decreases below the required value for any reason, such as a drop in the voltage of the A. C. source, for example. As long as sufficient charging current flows into the battery at the time when signal S is energized, lamp L will remain lighted over a circuit which may be traced from one terminal of battery D wires 27 and 28, contacts 29 and 30 of relay M, wire 31, lamp L, wire 32, contact 14—14a of relay C, and wire 33 to the other terminal of the battery. A release of relay M causes lamp L to be extinguished and provides an indication that the battery is not receiving sufficient charge. A defect in the rectifier E or transformer A such as might cause current to discharge from the battery through the rectifier or transformer will result in a reversal of current through relay M. Thereupon relay M will release its neutral contact 29 or both this contact and also the polar contact 30, thus providing an indication of the fault.

Although I have herein shown and described only three forms of apparatus embodying my invention, it is understood that various changes and modifications may be made therein within the scope of the appended claims without departing from the spirit and scope of my invention.

Having thus described my invention, what I claim is:

1. In combination, a storage battery, a source of alternating current, a circuit for charging said battery from said source, a load, a circuit controller for at times connecting said load with said source, an under-voltage relay normally energized from said source to a picked-up position and assuming a released position when the voltage of said source decreases a predetermined amount, a transfer relay energized over a front contact of said under-voltage relay and effective for transferring said load from said source to said battery, a charging-rate control relay energized from said battery and having a pickup value corresponding to the fully charged condition of the battery, a circuit governed by said circuit controller and effective at said times for releasing said charging-rate control relay, and means including a back contact of said charging-rate control relay for increasing the charging rate of said battery.

2. In combination, a storage battery, a source of alternating current, a circuit for charging said battery from said source, a load, a circuit controller for connecting said load with said source, a transfer relay for maintaining the load connected with said source provided the voltage of said source is above a predetermined value and effective for transferring the load to said storage battery when the voltage of said source is at or below such value, and means governed jointly by said transfer means and said circuit controller for increasing the charge received by said battery when the load has been transferred to said battery.

ROBERT M. GILSON.